(12) United States Patent
Hirokami

(10) Patent No.: US 10,899,779 B2
(45) Date of Patent: Jan. 26, 2021

(54) METHOD FOR MANUFACTURING AMINO GROUP-CONTAINING ORGANOSILICON COMPOUND

(71) Applicant: Shin-Etsu Chemical Co., Ltd., Tokyo (JP)

(72) Inventor: Munenao Hirokami, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/719,307

(22) Filed: Dec. 18, 2019

(65) Prior Publication Data

US 2020/0216477 A1 Jul. 9, 2020

(30) Foreign Application Priority Data

Jan. 7, 2019 (JP) ................. 2019-000615

(51) Int. Cl.
*C07F 7/18* (2006.01)

(52) U.S. Cl.
CPC ................. *C07F 7/1892* (2013.01)

(58) Field of Classification Search
None
See application file for complete search history.

(56) References Cited

U.S. PATENT DOCUMENTS 8,314,263 B2 11/2012 Ziche et al.

FOREIGN PATENT DOCUMENTS

JP 5236731 B2 7/2013

*Primary Examiner* — Clinton A Brooks
(74) *Attorney, Agent, or Firm* — Birch, Stewart, Kolasch & Birch, LLP

(57) ABSTRACT

A method for manufacturing an amino group-containing organosilicon compound of the following formula (1):

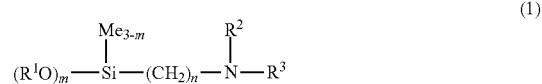

(1)

wherein each $R^1$ independently represents an alkyl group having 1 to 10 carbon atoms, etc., each of $R^2$ and $R^3$ represents a functional group of the following formula (4), etc., m represents an integer of 1 to 3, and n represents an integer of 1 to 12,

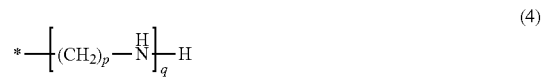

(4)

wherein an asterisk * represents a bond with an adjacent atom, p represents an integer of 1 to 12, and q represents an integer of 1 to 10, the method comprising:
(A) reacting an amine compound of the following formula (2):

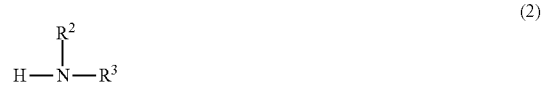

(2)

wherein $R^2$ and $R^3$ mean the same as above
with a halogen group-containing organosilicon compound of the following formula (3):

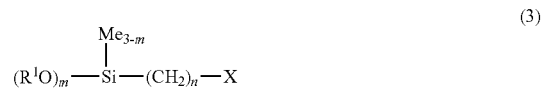

(3)

wherein X represents a chlorine atom, etc., and $R^1$ and n mean the same as above;
(B) removing an amine hydrohalide produced in the step (A), by liquid-liquid separation; and
(C) neutralizing an organic layer obtained in the step (B), using a base which amounts 0.1 to 0.95 mol equivalent, relative to a halide ion contained in the organic layer.

5 Claims, No Drawings

METHOD FOR MANUFACTURING AMINO GROUP-CONTAINING ORGANOSILICON COMPOUND

CROSS-REFERENCE TO RELATED APPLICATION

This non-provisional application claims priority under 35 U.S.C. § 119(a) on Patent Application No. 2019-000615 filed in Japan on Jan. 7, 2019, the entire contents of which are hereby incorporated by reference.

TECHNICAL FIELD

The present invention relates to a method for manufacturing an amino group-containing organosilicon compound.

BACKGROUND ART

Amino group-containing organosilicon compound has been used widely as a surface treatment agent or an adhesion auxiliary for composition.

A known method for manufacturing such amino group-containing organosilicon compound is such as reacting a chloro group-containing organosilicon compound with an amine compound. An amine hydrochloride produced as a result of reaction between the chloro group-containing organosilicon compound and the amine compound is usually removed by filtration or liquid-liquid separation.

For example, Patent Document 1 discloses a method for removing a produced solid amine hydrochloride by liquid-liquid separation, after liquefying it by adding a different kind of amine compound.

The method relying upon addition of the different kind of amine compound, which is successful in terms of improving productivity through liquid-liquid separation, however unfortunately suffers from degraded purity of the amine compound when collected by distillation, due to residence of such different kind of amine compound besides the original amine compound, making the amine compound unrecyclable. Another problems is that the amino group-containing organosilicon compound, with the different kind of amine compound mixed therein, is likely to be colored.

CITATION LIST

Patent Document 1: JP 5236731

SUMMARY OF THE INVENTION

The present invention, arrived at in consideration of the aforementioned situation, is therefore to provide a highly productive method for manufacturing an amino group-containing organosilicon compound with less coloration.

The present inventors found after our thorough studies that an amino group-containing organosilicon compound less likely to be colored is obtainable in high yield, by removing by liquid-liquid separation an amine hydrochloride produced as a result of reaction between a halogen group-containing organosilicon compound and an amine compound, followed by neutralization with a predetermined amount of base.

According to the present invention, there are provided

1. A method for manufacturing an amino group-containing organosilicon compound of the following formula (1):

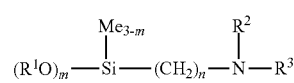
(1)

wherein each $R^1$ independently represents an alkyl group having 1 to 10 carbon atoms or an aryl group having 6 to 10 carbon atoms, each of $R^2$ and $R^3$ independently represents a hydrogen atom, an alkyl group having 1 to 10 carbon atoms, or a functional group of the following formula (4), m represents an integer of 1 to 3, n represents an integer of 1 to 12, and Me represents a methyl group,

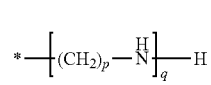
(4)

wherein an asterisk * represent a bond with an adjacent atom, p represents an integer of 1 to 12, and q represents an integer of 1 to 10, the method includes:
(A) reacting an amine compound of the following formula (2):

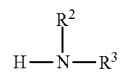
(2)

wherein $R^2$ and $R^3$ mean the same as above with a halogen group-containing organosilicon compound of the following formula (3):

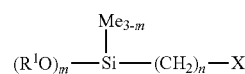
(3)

wherein X represents a chlorine atom, bromine atom, or iodine atom, and $R^1$ and n mean the same as above;

(B) removing an amine hydrohalide produced in the step (A), by liquid-liquid separation; and (C) neutralizing an organic layer obtained in the step (B), using a base which amounts 0.1 to 0.95 mol equivalent, relative to a halide ion contained in the organic layer.

2. The method for manufacturing an amino group-containing organosilicon compound according to 1, wherein, in the step (C), the base has the following formula (5):

 (5)

wherein M represents lithium, sodium or potassium, and $R^4$ represents an alkyl group having 1 to 10 carbon atoms.

3. The method for manufacturing an amino group-containing organosilicon compound according to 1 or 2, wherein q represents an integer of 2 to 10.

4. The method for manufacturing an amino group-containing organosilicon compound according to any one of 1 to 3, wherein, in the step (B), the liquid-liquid separation is carried out at a temperature of 60° C. or higher.

Advantageous Effects of the Invention

The manufacturing method according to the present invention makes it possible to obtain an amino group-containing organosilicon compound, less likely to be colored, in a highly productive manner.

DESCRIPTION OF THE PREFERRED EMBODIMENT

Hereinafter, the present invention is described in detail.

The method of the present invention is for manufacturing the amino group-containing organosilicon compound of the following formula (1):

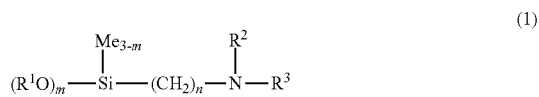

wherein Me represents a methyl group, the same hereinafter and the method includes:

(A) reacting an amine compound of the following formula (2) with a halogen group-containing organosilicon compound of the following formula (3):

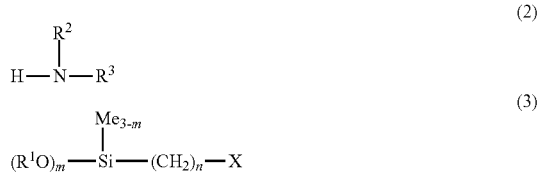

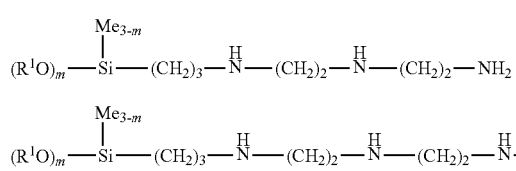

wherein X represents a chlorine atom, bromine atom, or iodine atom;

(B) removing an amine hydrohalide produced in the step (A), by liquid-liquid separation; and (C) neutralizing an organic layer obtained in the step (B), using a base which amounts 0.1 to 0.95 mol equivalent, relative to a halide ion contained in the organic layer.

In the individual formulae, each $R^1$ independently represents an alkyl group having 1 to 10 carbon atoms, or an aryl group having 6 to 10 carbon atoms.

The alkyl group having 1 to 10 carbon atoms may be straight-chain, cyclic or branched one, and is specifically exemplified by methyl, ethyl, n-propyl, i-propyl, n-butyl, s-butyl, t-butyl, n-pentyl, n-hexyl, n-heptyl, n-octyl, n-nonyl, n-decyl, cyclopropyl, cyclobutyl, cyclopentyl, cyclohexyl, cycloheptyl, and cyclooctyl groups.

The aryl group having 6 to 10 carbon atoms is specifically exemplified by phenyl, α-naphthyl, and β-naphthyl groups.

Among them, $R^1$ preferably represents a straight-chain alkyl group, and more preferably represents a methyl group or ethyl group.

m represents an integer of 1 to 3, and preferably represents an integer of 2 or 3.

n represents an integer of 1 to 12, preferably 1 to 8 from the viewpoint of availability of starting materials, and more preferably 3.

Each of $R^2$ and $R^3$ independently represents a hydrogen atom, an alkyl group having 1 to 10 carbon atoms, or a functional group of the following formula (4). The alkyl group having 1 to 10 carbon atoms is specifically exemplified by those described previously.

Among them, the manufacturing method of the present invention is suitable for manufacturing the amino group-containing organosilicon compound in which either $R^2$ or $R^3$ is the functional group of formula (4):

wherein an asterisk * represent a bond with an adjacent atom.

In formula (4), p represents an integer of 1 to 12, preferably 1 to 8 from the viewpoint of availability of starting materials, and more preferably 2.

Meanwhile, q represents an integer of 1 to 10, preferably 1 to 8 from the viewpoint of availability of starting materials. The manufacturing method of the present invention is particularly suitable for manufacturing the amino group-containing organosilicon compound with q of 2 to 8.

The amino group-containing organosilicon compound of the above formula (1) is exemplified by, but not limited to, amino group-containing organosilicon compound of the following formulae (6), (7) and (8). The manufacturing method of the present invention is particularly suitable for manufacturing these organosilicon compounds.

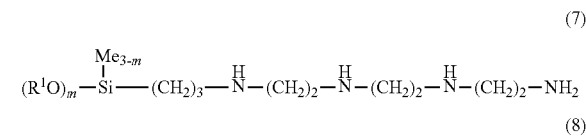

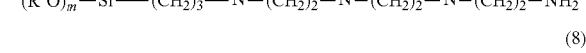

wherein $R^1$ and m mean the same as above.

Meanwhile, the halogen group-containing organosilicon compound of formula (3), which is used in step (A), is exemplified by, but not specially limited to, those of the following formulae (9) to (12):

-continued

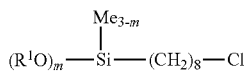 (11)

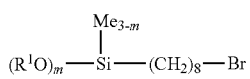 (12)

wherein R¹ and m mean the same as above.

Also the amine compound of the above formula (2) is not specially limited, and is exemplified by compounds of the following formulae (13) to (15), which respectively serve as the starting materials for the amino group-containing organosilicon compounds of the above formulae (6) to (8):

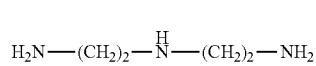 (13)

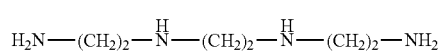 (14)

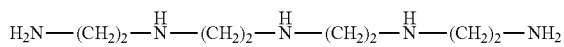 (15)

In the step (A) in the manufacturing method of the present invention, the amount of consumption of the amine compound of the above formula (2) is preferably 2 to 10 mol, per one mol of halogen group-containing organosilicon compound of the above formula (3), and more preferably 2 to 4 mol.

Reaction temperature in the step (A) is preferably 80 to 200° C., in view of enhancing the reactivity to improve the productivity, and of suppressing side reaction to further improve quality of the product, and more preferably 100 to 180° C.

Next, in the step (B), the hydrohalide, produced as a by-product in the step (A), of the amine compound of the formula (2) used as the starting material, is removed by liquid-liquid separation, unlike the technique described in the aforementioned Patent Document 1 that relies upon addition of a different kind of amine compound.

Process temperature in the step (B) is preferably 40 to 150° C., in view of improving efficiency of the liquid separation while keeping the reaction system in a liquid state, and more preferably 60 to 120° C.

Next, in the step (C), amount of halide ion contained in the organic layer remained after removal of the hydrohalide in the step (B) is measured, and the organic layer is then neutralized using a base which amounts 0.1 to 0.95 mol equivalent, relative to the thus determined amount of halide ion, and more preferably 0.5 to 0.95 mol equivalent.

With the base less than 0.1 mol, yield of the amino group-containing organosilicon compound obtainable by the subsequent distillation will degrade, making the productivity worse. Meanwhile, with the base more than 0.95 mol, the amino group-containing organosilicon compound obtainable after distillation will be colored.

The amount of halogen ion may be measured by titration with silver nitrate.

The base used in the step (C) has preferably, but not specifically limited to, the following formula (5):

$$R^4\text{—O-M} \quad (5)$$

In formula (5), M represents lithium, sodium or potassium, and R⁴ represents an alkyl group having 1 to 10 carbon atoms, and more preferably having 1 to 5 carbon atoms. The alkyl group having 1 to 10 carbon atoms is exemplified by those described previously.

The base of formula (5) is specifically exemplified by sodium methoxide, sodium ethoxide, potassium methoxide, potassium ethoxide, lithium methoxide, and lithium ethoxide.

The step (C) is preferably followed by (D) distillation, so as to purify the amino group-containing organosilicon compound.

EXAMPLES

The present invention is specifically explained below referring to Examples and Comparative Examples, without limiting the present invention. Reaction rates and purities were determined by gas chromatography (GC) using Agilent 6890N. Chlorine content was determined by titration with silver nitrate.

Example 1

In a 5 L separable flask equipped with a stirrer, a reflux condenser, a dropping funnel, and a thermometer, placed was 2,477 g (24 mol) of diethylenetriamine (from Tosoh Corporation), to which 1,590 g (8 mol) of chloropropyltrimethoxysilane (from Shin-Etsu Chemical Co., Ltd.) was added dropwise at 125° C. over 5 hours, and the mixture was then ripened at 130° C. for 3 hours. Percentage of reaction, measured by GC, was found to be 100%.

The inner temperature was then brought down to 80° C., and the layer containing the amine hydrochloride was then removed by liquid-liquid separation. The obtained organic layer was found to weigh 2,500 g, with a chlorine content of 5,500 ppm. Calculation revealed that the organic layer has a chlorine content of 0.39 mol.

To the organic layer freed of the amine hydrochloride, added was 63 g of a 28% sodium methoxide solution in methanol (0.32 mol as sodium methoxide) at 25° C., and the mixture was stirred at 25° C. for 3 hours. After completion of stirring, the mixture was purified by distillation, to thereby obtain 1,335 g of a target product mainly composed of (with a purity of 88%) an amino group-containing organosilicon compound of the following formula (16). The target product appeared to be a colorless clear liquid with a Hazen color number of 10. Also 600 g of diethylenetriamine was recovered. Diethylenetriamine was found to have a purity of 98%, with the balance (2%) of methanol.

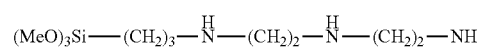 (16)

Example 2

In a 5 L separable flask equipped with a stirrer, a reflux condenser, a dropping funnel, and a thermometer, placed was 2,477 g (24 mol) of diethylenetriamine (from Tosoh Corporation), to which 1,590 g (8 mol) of chloropropyltrimethoxysilane (from Shin-Etsu Chemical Co., Ltd.) was added dropwise at 125° C. over 5 hours, and the mixture was then ripened at 130° C. for 3 hours. Percentage of reaction, measured by GC, was found to be 100%.

The inner temperature was then brought down to 80° C., and the layer containing the amine hydrochloride was then removed by liquid-liquid separation. The obtained organic layer was found to weigh 2,500 g, with a chlorine content of 5,500 ppm. Calculation revealed that the organic layer has a chlorine content of 0.39 mol.

To the organic layer freed of the amine hydrochloride, added was 39 g of a 28% sodium methoxide solution in methanol (0.20 mol as sodium methoxide) at 25° C., and the mixture was stirred at 25° C. for 3 hours. After completion of stirring, the mixture was purified by distillation, to thereby obtain 1,300 g of a target product mainly composed of (with a purity of 88%) an amino group-containing organosilicon compound of the above formula (16). The target product appeared to be a colorless clear liquid with a Hazen color number of 10. Also 600 g of diethylenetriamine was recovered. Diethylenetriamine was found to have a purity of 98%, with the balance (2%) of methanol.

Comparative Example 1

In a 5 L separable flask equipped with a stirrer, a reflux condenser, a dropping funnel, and a thermometer, placed was 2,477 g (24 mol) of diethylenetriamine (from Tosoh Corporation), to which 1,590 g (8 mol) of chloropropyltrimethoxysilane (from Shin-Etsu Chemical Co., Ltd.) was added dropwise at 125° C. over 5 hours, and the mixture was then ripened at 130° C. for 3 hours. Percentage of reaction, measured by GC, was found to be 100%.

The inner temperature was then brought down to 80° C., and the layer containing the amine hydrochloride was then removed by liquid-liquid separation. The obtained organic layer was found to weigh 2,500 g, with a chlorine content of 5,500 ppm. Calculation revealed that the organic layer has a chlorine content of 0.39 mol.

To the organic layer freed of the amine hydrochloride, added was 77 g of a 28% sodium methoxide solution in methanol (0.40 mol as sodium methoxide) at 25° C., and the mixture was stirred at 25° C. for 3 hours. After completion of stirring, the mixture was purified by distillation, to thereby obtain 1,350 g of a target product mainly composed of (with a purity of 88%) an amino group-containing organosilicon compound of the above formula (16). The target product appeared to be a yellow clear liquid with a Hazen color number of 200. Also 600 g of diethylenetriamine was recovered. Diethylenetriamine was found to have a purity of 98%, with the balance (2%) of methanol.

Comparative Example 2

In a 5 L separable flask equipped with a stirrer, a reflux condenser, a dropping funnel, and a thermometer, placed was 2,477 g (24 mol) of diethylenetriamine (from Tosoh Corporation), to which 1,590 g (8 mol) of chloropropyltrimethoxysilane (from Shin-Esu Chemical Co., Ltd.) was added dropwise at 125° C. over 5 hours, and the mixture was then ripened at 130° C. for 3 hours. Percentage of reaction, measured by GC, was found to be 100%.

The inner temperature was then brought down to 80° C., and the layer containing the amine hydrochloride was then removed by liquid-liquid separation. The obtained organic layer was found to weigh 2,500 g, with a chlorine content of 5,500 ppm. Calculation revealed that the organic layer has a chlorine content of 0.39 mol.

To the organic layer freed of the amine hydrochloride, added was 154 g of a 28% sodium methoxide solution in methanol (0.80 mol as sodium methoxide) at 25° C., and the mixture was stirred at 25° C. for 3 hours. After completion of stirring, the mixture was purified by distillation, to thereby obtain 1,360 g of a target product mainly composed of (with a purity of 88%) an amino group-containing organosilicon compound of the above formula (16). The target product appeared to be a yellow clear liquid with a Hazen color number of 300. Also 600 g of diethylenetriamine was recovered. Diethylenetriamine was found to have a purity of 98%, with the balance (2%) of methanol.

Comparative Example 3

In a 5 L separable flask equipped with a stirrer, a reflux condenser, a dropping funnel, and a thermometer, placed was 2,477 g (24 mol) of diethylenetriamine (from Tosoh Corporation), to which 1,590 g (8 mol) of chloropropyltrimethoxysilane (from Shin-Etsu Chemical Co., Ltd.) was added dropwise at 125° C. over 5 hours, and the mixture was then ripened at 130° C. for 3 hours. Percentage of reaction, measured by GC, was found to be 100%.

The inner temperature was then brought down to 80° C., and the layer containing the amine hydrochloride was then removed by liquid-liquid separation. The obtained organic layer was found to weigh 2,500 g, with a chlorine content of 5,500 ppm.

The organic layer freed of the amine hydrochloride was then purified by distillation, to thereby obtain 1,000 g of a target product mainly composed of (with a purity of 88%) an amino group-containing organosilicon compound of the above formula (16), where the content inside a distillation pot was found to form salt and to solidify. The target product appeared to be a colorless clear liquid with a Hazen color number of 10. Also 600 g of diethylenetriamine was recovered. Diethylenetriamine was found to have a purity of 98%, with the balance (2%) of methanol.

Comparative Example 4

In a 5 L separable flask equipped with a stirrer, a reflux condenser, a dropping funnel, and a thermometer, placed was 2,477 g (24 mol) of diethylenetriamine (from Tosoh Corporation), to which 1,590 g (8 mol) of chloropropyltrimethoxysilane (from Shin-Etsu Chemical Co., Ltd.) was added dropwise at 125° C. over 5 hours, and the mixture was then ripened at 130° C. for 3 hours. Percentage of reaction, measured by GC, was found to be 100%.

The inner temperature was then brought down to 30° C., but the subsequent liquid-liquid separation was not feasible, since the organic layer and the amine hydrochloride layer were not separable.

Comparative Example 5

In a 5 L separable flask equipped with a stirrer, a reflux condenser, a dropping funnel, and a thermometer, placed was 2,477 g (24 mol) of diethylenetriamine (from Tosoh Corporation), to which 1,590 g (8 mol) of chloropropyltrimethoxysilane (from Shin-Etsu Chemical Co., Ltd.) was added dropwise at 125° C. over 5 hours, and the mixture was then ripened at 130° C. for 3 hours. Percentage of reaction, measured by GC, was found to be 100%. Additionally, 481 g (8 mol) of ethylenediamine (from Tosoh Corporation) was added at 30° C., the mixture was stirred for 3 hours, and the amine hydrochloride layer was removed by liquid-liquid separation. The obtained organic layer was found to weigh 2,700 g, with a chlorine content of 3.000 ppm.

The organic layer freed of the amine hydrochloride was then purified by distillation, to thereby obtain 1,300 g of a target product mainly composed of (with a purity of 88%) an amino group-containing organosilicon compound of the above formula (16). The target product appeared to be a colorless clear liquid with a Hazen color number of 20. Also 700 g of diethylenetriamine was recovered. Diethylenetriamine was found to have a purity of 90%, with the balance in which ethylene diamine accounting for 8% and methanol accounting for 2%. Note that the thus recovered diethylenetriamine contains ethylenediamine, and is therefore not directly recyclable for the next reaction.

Japanese Patent Application No. 2019-000615 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for manufacturing an amino group-containing organosilicon compound of the following formula (1):

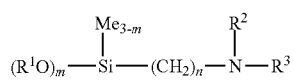

(1)

wherein each $R^1$ independently represents an alkyl group having 1 to 10 carbon atoms or an aryl group having 6 to 10 carbon atoms, each of $R^2$ and $R^3$ independently represents a hydrogen atom, an alkyl group having 1 to 10 carbon atoms, or a functional group of the following formula (4), m represents an integer of 1 to 3, n represents an integer of 1 to 12, and Me represents a methyl group,

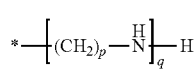

(4)

wherein an asterisk * represents a bond with an adjacent atom, p represents an integer of 1 to 12, and q represents an integer of 1 to 10, the method comprising:

(A) reacting an amine compound of the following formula (2):

(2)

wherein $R^2$ and $R^3$ mean the same as above
with a halogen group-containing organosilicon compound of the following formula (3):

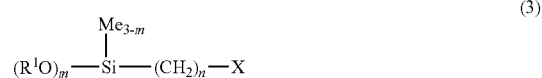

(3)

wherein X represents a chlorine atom, bromine atom, or iodine atom, and $R^1$ and n mean the same as above;

(B) removing an amine hydrohalide produced in the step (A), by liquid-liquid separation; and (C) neutralizing an organic layer obtained in the step (B), using a base which amounts 0.1 to 0.95 mol equivalent, relative to a halide ion contained in the organic layer.

2. The method for manufacturing an amino group-containing organosilicon compound according to claim 1, wherein, in the step (C), the base has the following formula (5):

(5)

wherein M represents lithium, sodium or potassium, and $R^4$ represents an alkyl group having 1 to 10 carbon atoms.

3. The method for manufacturing an amino group-containing organosilicon compound according to claim 1, wherein the q represents an integer of 2 to 10.

4. The method for manufacturing an amino group-containing organosilicon compound according to claim 1, wherein, in the step (B), the liquid-liquid separation is carried out at a temperature of 60° C. or higher.

5. The method for manufacturing an amino group-containing organosilicon compound according to claim 1, wherein at least one of $R^2$ and $R^3$ represents a functional group of the formula (4) and the q in formula (4) represents an integer of 2 to 10.

* * * * *